UNITED STATES PATENT OFFICE.

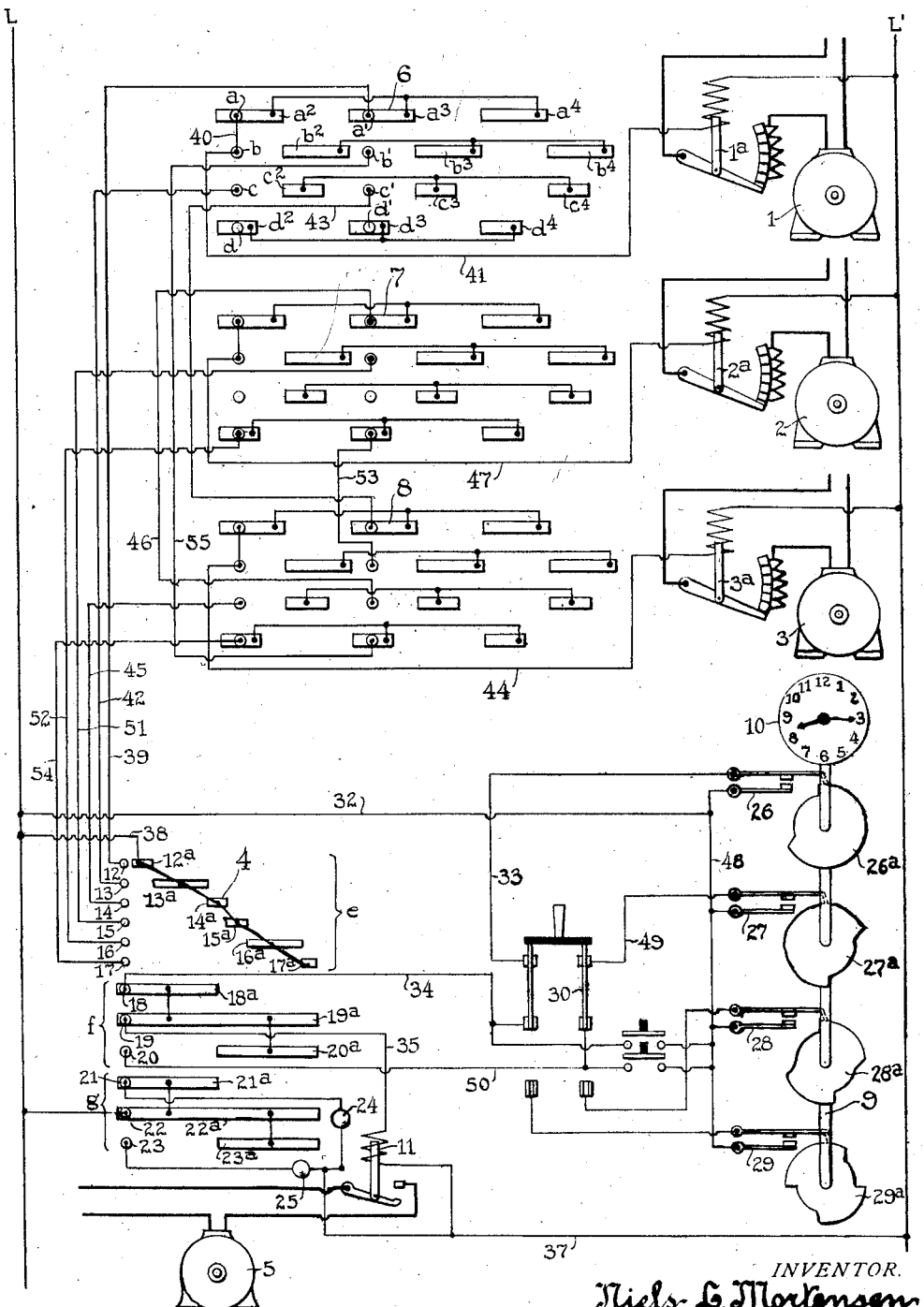

NIELS L. MORTENSEN, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

1,412,568.  Specification of Letters Patent.  Patented Apr. 11, 1922.

Application filed October 26, 1916. Serial No. 127,759.

*To all whom it may concern:*

Be it known that I, NIELS L. MORTENSEN, a subject of the King of Denmark, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to motor controllers.

In practice it is frequently desired to employ a plurality of motors for respectively operating different parts of a mechanism and to control such motors for cyclic operation thereof at regular intervals. Considering for example a coke oven having two gas cock operating motors and an air valve and damper operating motor, it is desired to operate said motors sequentially at regular intervals to reverse the sequence of each cycle relatively to that of the former cycle and to time the operation of each motor relatively to the operation of the preceding motor, etc.

The present invention relates more particularly to controllers for the aforesaid and other mechanisms requiring cyclic operation of a plurality of motors and has various objects and advantages which will be apparent from the embodiment of the invention shown in the accompanying drawing.

The drawing illustrates diagrammatically an embodiment of the invention designed particularly for the control of the motors of that type of coke oven above described.

Referring more specifically to the drawing, there are illustrated three motors 1, 2 and 3, which for convenience, are shown as supplied from separate power sources. The motors 1 and 2 are provided for operating the oven gas cocks and the motor 3 for operating the oven air valves and damper, said motors to be operated sequentially at regular intervals and subject to reversal of sequence to produce the following cycles:

Cycle No. 1.

Operation of motor 1.
Time interval.
Operation of motor 3.
Time interval.
Operation of motor 2.

Cycle No. 2.

Operation of motor 2.
Time interval.
Operation of motor 3.
Time interval.
Operation of motor 1.

The controller includes electro-responsive starting devices $1^a$, $2^a$ and $3^a$ for the motors 1, 2 and 3 respectively, a circuit controlling device 4 operable by a motor 5, limit switches 6, 7 and 8 to be operated by the motors 1, 2 and 3 respectively, and a switching device 9 operable by a time clock 10 to control the motor 5, through an electro-responsive switch 11. As will hereinafter appear, the time controlled switching device 9 serves periodically to start the motor 5, said motor in turn operating the controller 4 to start the motors 1, 2 and 3 in different orders determinable by the limit switches while the limit switches further serve to stop their respective motors after operation thereof to definite degrees.

The limit switches are all of like construction and are schematically illustrated as of the drum type. Referring to the limit switch 6 as typical of all, the same comprises two sets of stationary contacts $a$, $b$, $c$, $d$ and $a'$, $b'$, $c'$ and $d'$ and three sets of co-operating contact segments. One set of the latter comprise segments $a^2$, $b^2$, $c^2$ and $d^2$, while the second set comprises segments $a^3$, $b^3$, $c^3$ and $d^3$ and the third set comprises segments $\cdot$, $b^4$, $c^4$ and $d^4$. All like lettered segments are interconnected and are of corresponding size and arrangement whereby the limit switch upon continuous rotation merely alternates two sets of connections, one set represented by engagement of segments $a^2$, $a^3$, $d^2$ and $d^3$ with contacts $a$, $a'$, $d$ and $d'$ respectively and the other set being represented by engagement of contacts $b^2$, $b^3$, $c^2$ and $c^3$ with contacts $b$, $b'$, $c$ and $c'$ respectively. As will be understood, each limit switch is operable in synchronism with its respective motors.

The controller 4 is also schematically illustrated as of the drum type and as provided with three sets of co-operating contacts $e$, $f$ and $g$. The set $e$ comprises contacts 12 to 17 interconnected with the limit switches and co-operating segments $12^a$ to $17^a$ arranged to progressively energize the starting switches of the several motors in either of two sequences. As shown, the segments 12ª to 17ª are of varying length to permit operation of the motors throughout different degrees of angular movement of the device 4, it being assumed that it is desired to operate the gas cock motors for like and relatively short periods and the other motor for a relatively longer period. It is to be remembered, however, that the segments merely control starting of the motors and that stopping is effected by their respective limit switches. Thus, irrespective of the length of the several segments the proposed time intervals between stopping and starting of the several motors may be and is provided for in the staggering of said segments. For example, the time interval between stopping and starting of the motors controlled by segments 12ª and 13ª is determinable by the spacing of the forward ends of said segments, allowance being made for a given angular movement of segment 12ª preceding the stopping of its respective motor by its limit switch. The set "$f$" comprises contacts 18, 19 and 20 and co-operating segments 18ª, 19ª and 20ª constituting a limit switch for the motor 5. More specifically, the contacts and segments of set "$f$" are included in circuit between the winding of switch 11 and the time switch device 9, the arrangement of the contacts and segments being such as to de-energize switch 11 to stop motor 5 upon operation of the controller 4 through a half revolution. The segment "$g$" comprises contacts 21, 22 and 23 and co-operating segments 21ª, 22ª and 23ª co-operating to selectively energize lamps 24 and 25. The arrangement of segments and contacts being identical with set "$f$" and hence such as to substitute one lamp for another upon each half revolution of the controller. The lamps, as will hereinafter appear, serve to indicate the sequence of operation of the motors during their last completed cycle.

The switching device 9 comprises four switches, 26, 27, 28 and 29 biased to closed position and movable to open position by cams 26ª, 27ª, 28ª and 29ª respectively, said cams being operable by the clock 10. The switches and cams are divided into two sets for alternative use, determinable by a double pole, double throw switch 30. The switches of each set are connected with the limit switch section of the controller 4 whereby one-half revolution of controller 4 is dependent upon closure of one of said switches while the other half revolution of said controller is dependent upon closure of the other of said switches and the two sets of switches and cams are provided to enable variation of the intervals between the cycles of operation affected by the controller 4. That is to say, the cams of one set are so designed as to hold their respective switches open during a greater angular movement of the clock operated shaft than the cams of the other set and, as will be apparent, the length of time that the switches are held open determines the time intervals between cycles. If, for example, one revolution of the cam represents an hour's time it will be observed that the cams 28ª and 29ª provide for approximately fifteen minute intervals between the closing of one switch and closing of the other while the cams 26ª and 27ª provide for approximately thirty minute intervals.

Assuming, for example, closure of switch 26, the following cycle of operation will result: First, the switch 26 would complete the circuit of the winding of switch 11 from line L by conductor 32 to and through switch 26 by conductor 33 through switch 30, by conductor 34, contact 18 of controller 4, thence to segment 18ª, segment 19ª and contact 19 by conductor 35 to and through said winding by conductor 37 to line L'. This would energize switch 11 to start motor 5 and hence start the controller 4. Controller 4 would then engage its segment 12ª and contact 12 thereby completing circuit from line L by conductor 38 to and through said segment and contact, by conductor 39 to contact $a'$ of limit switch 6, by the interconnected segments $a^3$ and $a^2$ to contact $a$ by conductors 40 and 41 to and through the winding of starting device 1ª to line L'. This would start the gas cock motor 1 which would then continue to operate until the limit switch 6 had disengaged its segments and contacts above specified whereupon the starting device 1ª would be de-energized and the motor 1 stopped. Second, the controller 4 would then travel idly until it engaged segment 13ª with contact 13 whereupon it would complete circuit from line L by conductor 38 to and through said segment and contact, by conductor 42 to and through the then engaged contact $c$ and segment $c^2$ of limit switch 6, thence to the interconnected segment $c^3$ and contact $c'$, by conductor 43 to and through the contacts $a^3$, $a'$ and $a^2$ and a contact of limit switch 8 by conductor 44 to and through the winding of starting device 3ª. This would start the air valve and damper motor 3 which would then continue to operate until limit switch 8 had disengaged its contacts just specified whereupon the starting device 3ª would be de-energized and said motor stopped. Third, the controller 4 would then operate idly until it engaged segment 14ª with contact 14 whereupon it would complete circuit from line L to said segment and contact, thence by conductor 45 to and through the then engaged contacts $c$, $c^2$, $c'$ and $c^3$ of limit switch 8, by conductor 46 to and through the $a$, $a^2$, $a'$, and $a^3$ contacts of limit switch 7 and thence by conductor 47 to and through the winding of starting device 2ª to line L. This would start the other gas cock motor which would continue to operate until stopped by its limit switch 2ª, thereby completing the cycle. Thereupon the controller 4 would have completed a half revolution and by disengagement of segment 18ª from contact 18 would have de-energized switch 11 and thereby stopped its driving motor 5, bringing the entire mechanism to rest. Throughout this cycle the lamp 24 would have been energized by the engagement of segments 21ª and 21 whereas upon completion of the cycle said lamp would be de-energized and the lamp 25 energized by engagement of segment 23ª and contact 23.

Again assuming subsequent movement of the cams to release switch 27, the following cycle of operation would result. First, said switch 27 would energize switch 11 to restart motor 5, the energizing circuit of said switch under such conditions being traceable from line L by conductors 32 and 48 through switch 27, by conductor 49 through switch 30, by conductor 50 to and through the then engaged contacts 20, 20ª, 19ª and 19 to conductor 35. The motor would then operate the controller to engage contacts 15ª and 15 thereby completing circuit from line L to and by conductor 51 through the then engaged $b'$, $b^3$, $b^2$ and $b$ contacts of limit switch 7, by conductor 47 to and through the winding of starting device 2ª. This would again start motor 2 which would continue to operate until stopped by disengagement of said contacts of its limit switch 7. Second, the controller 4 would then travel idly until it engaged segment 16ª and contact 16 which would complete circuit from line L to and by conductor 52 to and through the then engaged contacts $d$, $d^3$, $d^4$ and $d'$ of limit switch 7, by conductor 53 to and through the then engaged contacts $b'$, $b^3$, $b^2$ and $b$ of limit switch 8 to and by conductor 44 through the winding of starting device 3ª. This would again start motor 3 which would continue to operate until stopped by disengagement of said last specified contacts of its limit switch 8. Third, the controller 4 would travel idly until it engaged segment 17ª and contact 17 thereby completing circuit from line L to and by conductor 54 to and through the then engaged contacts $d$, $d^3$, $d^4$ and $d'$ of limit switch 8, by conductor 55 through the then engaged contacts $b'$, $b^3$, $b^2$ and $b$ of limit switch 7 and thence by conductor 41 to and through the winding of starting device 1ª. This would again start motor 1 which would continue to operate until stopped by disengagement of said contacts of its limit switch 7 thereby completing the second cycle. Thereupon the controller 4 would complete another half revolution and by disengagement of contacts 20ª and 20 would have de-energized switch 11 and thereby stopped motor 5. Throughout this cycle the lamp 25 would have been energized by engagement of contacts 23ª and 23 whereas upon completion of the cycle said lamp would have been de-energized and the lamp 24 energized by re-engagement of contacts 19ª and 19.

What I claim as new and desire to secure by Letters Patent is:

1. In combination, a plurality of electric motors, an intermittently operable time-controlled device and means to effect intermittent operations of said motors subject to control by said device to definitely time the initiation of cycles of operation of said motors collectively, said means acting to stop each of said motors independently of said device.

2. In combination, a plurality of electric motors, an intermittently operable time controlled device and means to effect intermittent operations of said motors subject to control by said device to definitely time the initiation of cycles of operation of said motors collectively, said means including a limit switch associated with each of said motors to stop the same independently of said device.

3. In combination, a plurality of electric motors, an intermittently operable time controlled switch, an electro-magnetically operated device to start said motors sequentially but subject to control by said switch to definitely time the initiation of operation of certain of said motors and a limit switch associated with each of said motors to stop the same independently of said device.

4. In combination, a plurality of electric motors, starting and stopping means for said motors including electro-magnetically operated means to time the operation of said motors, individually and positively timed means controlling said electro-magnetically operated means to time the operation of said motors collectively.

5. In combination, a plurality of electric motors, electromagnetically operated means for starting said motors progressively, limit switches associated with said motors to stop each upon a predetermined degree of operation thereof and positively timed means controlling said electromagnetically operated means to time the cycles of motor operation effected thereby.

6. In combination, a plurality of electric motors, means for starting and stopping the same including a motor driven device to effect cyclic operation of said motors and independently and positively timed means controlling said device to time the commencement of each cycle of motor operation effected thereby.

7. In combination, a plurality of electric motors, a motor driven timing device controlling the starting of said motors, limit switches associated with said motors to effect stopping thereof and a positively timed device controlling said motor driven device for timing the initiation of each cycle of motor operation effected by said device.

8. In combination, a plurality of electric motors, means including a motor driven-timing device to effect a given cycle of operation of said motors, said device being self arresting upon completion of each cycle and positively timed means for periodically starting said motor driven device.

9. In combination, a plurality of electric motors, limit switches associated therewith to limit each to given cycles of operation, a motor driven timing device to start said motors sequentially, said device being self-arresting upon completion of a given cycle of operation of said motors, collectively and positively timed means for starting said device at given times.

10. In combination, a plurality of electric motors, individual limit switches therefor and an electromagnetically operated device co-operating to effect cyclic operation of said motors and to time the operation of said motors individually and relatively to one another and positively timed means controlling said electromagnetically operated means to time the initiation of each cycle of motor operation.

11. In combination, a plurality of electric motors, limit switches therefor and a motor driven device co-operating to effect cyclic operation of said motors and to time the operation thereof individually and relatively to one another, said motor driven device being self arresting upon completion of each cycle of motor operation and positively timed means to start said motor driven device at definite times.

12. In combination, a plurality of electric motors, means including a motor driven timing device to effect sequential operation of said motors in cycles and to vary the sequence of operation of said motors for successive cycles and independently and positively timed means controlling said motor driven device for initiation at definite times of the cycles of operation effected thereby.

13. In combination, a plurality of electric motors, limit switches and a motor driven timing device co-operating to effect sequential operation of said motors in cycles and to vary the sequence of operation of said motors for successive cycles, said motor-driven timing device being self-arresting upon completion of each cycle and positively timed means for starting said motor driven device at definite times.

In witness whereof, I have hereunto subscribed my name.

NIELS L. MORTENSEN.